United States Patent
Jahnke et al.

(10) Patent No.: US 11,541,350 B2
(45) Date of Patent: Jan. 3, 2023

(54) HEAT RECOVERY FROM AN ELECTROCHEMICAL HYDROGEN SEPARATION SYSTEM

(71) Applicant: FuelCell Energy, Inc., Danbury, CT (US)

(72) Inventors: Fred C. Jahnke, Rye, NY (US); Matthew Lambrech, Sherman, CT (US)

(73) Assignee: FuelCell Energy, Inc., Danbury, CT (US)

( * ) Notice: Subject to any disclaimer, the term of this patent is extended or adjusted under 35 U.S.C. 154(b) by 817 days.

(21) Appl. No.: 16/536,535

(22) Filed: Aug. 9, 2019

(65) Prior Publication Data
US 2020/0054993 A1 Feb. 20, 2020

Related U.S. Application Data

(60) Provisional application No. 62/718,703, filed on Aug. 14, 2018.

(51) Int. Cl.
*B01D 53/32* (2006.01)
*B01D 53/26* (2006.01)

(52) U.S. Cl.
CPC ......... *B01D 53/326* (2013.01); *B01D 53/263* (2013.01); *B01D 2257/108* (2013.01)

(58) Field of Classification Search
CPC .................................................. B01D 53/326
See application file for complete search history.

(56) References Cited

U.S. PATENT DOCUMENTS

| | | |
|---|---|---|
| 7,150,927 B2 | 12/2006 | Hickey et al. |
| 7,201,979 B2 | 4/2007 | McElroy et al. |
| 7,364,810 B2 | 4/2008 | Sridhar et al. |
| 7,422,810 B2 | 9/2008 | Venkataraman et al. |
| 7,482,078 B2 | 1/2009 | Sridhar et al. |
| 7,575,822 B2 | 8/2009 | Mitlitsky et al. |
| 7,704,618 B2 | 4/2010 | Venkataraman et al. |
| 7,781,112 B2 | 8/2010 | Sridhar et al. |
| 7,833,668 B2 | 11/2010 | Ballantine et al. |
| 7,846,599 B2 | 12/2010 | Ballantine et al. |
| 7,878,280 B2 | 2/2011 | Sridhar et al. |
| 7,887,971 B2 | 2/2011 | Hickey et al. |
| 7,901,814 B2 | 3/2011 | Venkataraman et al. |
| 8,053,136 B2 | 11/2011 | Hickey et al. |
| 8,071,241 B2 | 12/2011 | Sridhar et al. |
| 8,071,246 B2 | 12/2011 | Mitlitsky et al. |
| 8,277,992 B2 | 10/2012 | Mitlitsky et al. |

(Continued)

FOREIGN PATENT DOCUMENTS

| | | | |
|---|---|---|---|
| EP | 1 620 906 | 2/2006 | |
| EP | 1 665 441 | 6/2006 | |
| EP | 3511441 A1 * | 7/2019 | ........... B01D 53/326 |

*Primary Examiner* — Nicholas A Smith
(74) *Attorney, Agent, or Firm* — Foley & Lardner LLP

(57) ABSTRACT

An EHS system includes a EHS cell having an anode, a cathode, and a cooling plate disposed proximate at least one of the anode or the cathode, the cooling plate configured to receive water and configured to output steam or a mixture of water and steam. The system further includes a liquid-vapor separator (LVS) configured to receive the steam or the mixture of water and steam from the cooling plate and to separate water and steam. The LVS is configured to output water to the cooling plate.

20 Claims, 2 Drawing Sheets

(56) References Cited

U.S. PATENT DOCUMENTS

| | | | |
|---|---|---|---|
| 8,435,689 | B2 | 5/2013 | Venkataraman |
| 8,663,859 | B2 | 3/2014 | Mitlitsky et al. |
| 8,852,820 | B2 | 10/2014 | Perry et al. |
| 9,190,693 | B2 | 11/2015 | Sridhar et al. |
| 9,413,017 | B2 | 8/2016 | Bandhauer et al. |
| 9,722,273 | B2 | 8/2017 | Perry et al. |
| 9,911,989 | B2 | 3/2018 | Mcelroy et al. |
| 9,947,955 | B2 | 4/2018 | Sridhar et al. |
| 10,581,090 | B2 | 3/2020 | Ballantine et al. |
| 10,631,442 | B2 | 4/2020 | Lecourtier |
| 2010/0266923 | A1 | 10/2010 | Mcelroy et al. |
| 2011/0189567 | A1 | 8/2011 | Venkataraman et al. |
| 2019/0131645 | A1* | 5/2019 | Jahnke .............. H01M 8/04097 |
| 2019/0316603 | A1* | 10/2019 | Zhang ....................... F04F 9/02 |
| 2020/0161671 | A1 | 5/2020 | Ballantine et al. |

\* cited by examiner

HEAT RECOVERY FROM AN ELECTROCHEMICAL HYDROGEN SEPARATION SYSTEM

CROSS-REFERENCE TO RELATED APPLICATIONS

This application claims the benefit of U.S. Provisional Application No. 62/718,703, filed Aug. 14, 2018, the entire disclosure of which is hereby incorporated by reference herein.

STATEMENT OF GOVERNMENT RIGHTS

This invention was made with government support under DE-EE0003679 awarded by the Department of Energy. The government has certain rights in this invention.

BACKGROUND

The present application relates generally to the field of heat recovery in electrochemical hydrogen separation systems.

Conventionally, feed gas to a fuel cell may require a certain steam-to-carbon ratio to operate efficiently and minimize degradation of the fuel cell. To provide steam to saturate the feed gas, water must be heated until it is vaporized into steam. This vaporization process requires large energy inputs to generate sufficient heat to vaporize the water, increasing the cost and energy consumption for operating the fuel cell system.

Further, high temperature fuel cells produce hydrogen as part of their normal operation. Typically this hydrogen is burned to produce waste heat. An alternate option may be to purify and recover the hydrogen in the anode exhaust and export it as a coproduct. One method of purifying the hydrogen includes using a high temperature electrochemical hydrogen separator, which is tolerant to carbon monoxide, to isolate hydrogen. The system generates heat, which may be utilized in other portions of the fuel cell system.

It may be advantageous to generate steam in other portions of the fuel cell system or use heat from the other portions to generate steam and/or reduce other heating requirements for generating steam in the fuel cell system.

SUMMARY

One embodiment relates to a EHS system, including a EHS cell having an anode, a cathode, and a cooling plate disposed proximate at least one of the anode or the cathode, the cooling plate configured to receive water and configured to output steam or preferably a mixture of water and steam. The system further includes a liquid-vapor separator (LVS) configured to receive the steam or the mixture of water and steam from the cooling plate and to separate water and steam. The LVS is configured to output water to the cooling plate.

One aspect of the system relates to a saturator configured to receive steam from the LVS. The LVS is configured to output steam to the saturator.

Another aspect of the system relates to the saturator being configured to receive water from the LVS.

Another aspect of the system relates to a heat exchanger configured to heat water from the saturator and output heated water to the saturator.

Another aspect of the system relates to the cooling plate being configured to transfer heat from at least one of the anode or the cathode to the water passing through the cooling plate.

Another aspect of the system relates to a temperature of the cooling plate being controlled by controlling a pressure in the LVS.

Another aspect of the system relates to a heater configured to receive and heat water from the LVS. The cooling plate is configured to receive heated water from the LVS.

Another aspect of the system relates to the cooling plate being configured to transfer heat from at least one of the anode or the cathode to the water passing through the cooling plate.

Another aspect of the system relates to at least one of the anode or the cathode being configured to receive a current and electrochemically separate hydrogen from other gases.

Another embodiment relates to a method of operating an electrochemical hydrogen separator (EHS) system, including passing water through a cooling plate disposed proximate at least one of an anode or a cathode in an EHS, and transferring heat from at least one of the anode or the cathode, through the cooling plate, to the water in the cooling plate. The method further includes vaporizing at least a portion of the water in the cooling plate into steam, and outputting a mixture of water and steam from the cooling plate. The method further includes receiving the mixture of water and steam from the cooling plate at a liquid-vapor separator (LVS), and separating steam and water in the LVS.

One aspect of the method relates to feeding water from the LVS to the cooling plate.

Another aspect of the method relates to mixing steam from the LVS with feed gas for a fuel cell, and feeding a mixture of steam and feed gas to a saturator.

Another aspect of the method relates to the mixture of steam and feed gas having a steam-to-carbon ratio less than 2.0 prior to being fed to the saturator.

Another aspect of the method relates to feeding steam from the LVS to the saturator, and feeding water from the LVS to the saturator.

Another aspect of the method relates to vaporizing water from the saturator in a first heat exchanger, outputting steam from the first heat exchanger to the saturator, and mixing steam from the first heat exchanger with the mixture of steam and feed gas.

Another aspect of the method relates to the mixture of steam and feed gas in the saturator having a steam-to-carbon ratio of approximately 2.0.

Another embodiment relates to a method of operating an electrochemical hydrogen separator (EHS) system, including passing water through a cooling plate disposed proximate at least one of an anode or a cathode in an EHS, and transferring heat from the water through the cooling plate to at least one of the anode or the cathode. The method further includes receiving water from the cooling plate at a liquid-vapor separator (LVS), heating water from the LVS in a heater, and receiving water from the heater at the cooling plate.

One aspect of the method relates to separating steam and water in the LVS, and outputting steam from the LVS.

Another aspect of the method relates to feeding at least a portion of the water from the LVS to a saturator.

Another aspect of the method relates to introducing make-up water to the system upstream from the heater.

DETAILED DESCRIPTION

Referring to the FIGURES generally, a hydrogen purification system (e.g., an electrochemical hydrogen separation system, a fuel cell system, etc.) is shown according to various exemplary embodiments. The system includes an Electrochemical Hydrogen Separator ("EHS"), which is or is similar to a hydrogen fuel cell having an anode, a cathode, and a membrane structure disposed therebetween. Electricity is supplied to the EHS to electrochemically drive hydrogen from one side of the membrane structure to another to output separated (e.g., purified) hydrogen therefrom, among other gases or liquids. The EHS may be used in conjunction with a fuel cell, such that the EHS receives anode exhaust gas from the fuel cell for purification or other conversion of the exhaust. The fuel cell may be a Direct Fuel Cell ("DFC"), a Molten Carbonate Fuel Cell ("MCFC"), a Solid Oxide Fuel Cell ("SOFC") or other type of fuel cell.

The hydrogen purification system advantageously recovers heat from the EHS by returning the steam generated from cooling the EHS to humidify the feed to the fuel cell, either directly injecting the steam in the feed or sending the steam to a feed saturator. By returning the steam to the fuel cell feed, less heat is required to be transferred from fuel cell cathode exhaust to water being supplied to a saturator for steam generation and humidification. The return of the steam to the fuel cell feed also increases the temperature of cathode exhaust fed to a Heat Recovery Unit ("HRU"), increasing the amount of heat recovered in the HRU. The hydrogen purification system may further recover some or all of the condensate from the steam generated by the EHS, reducing the amount of make-up water that must be added to the fuel cell system during operation.

Figure 1:
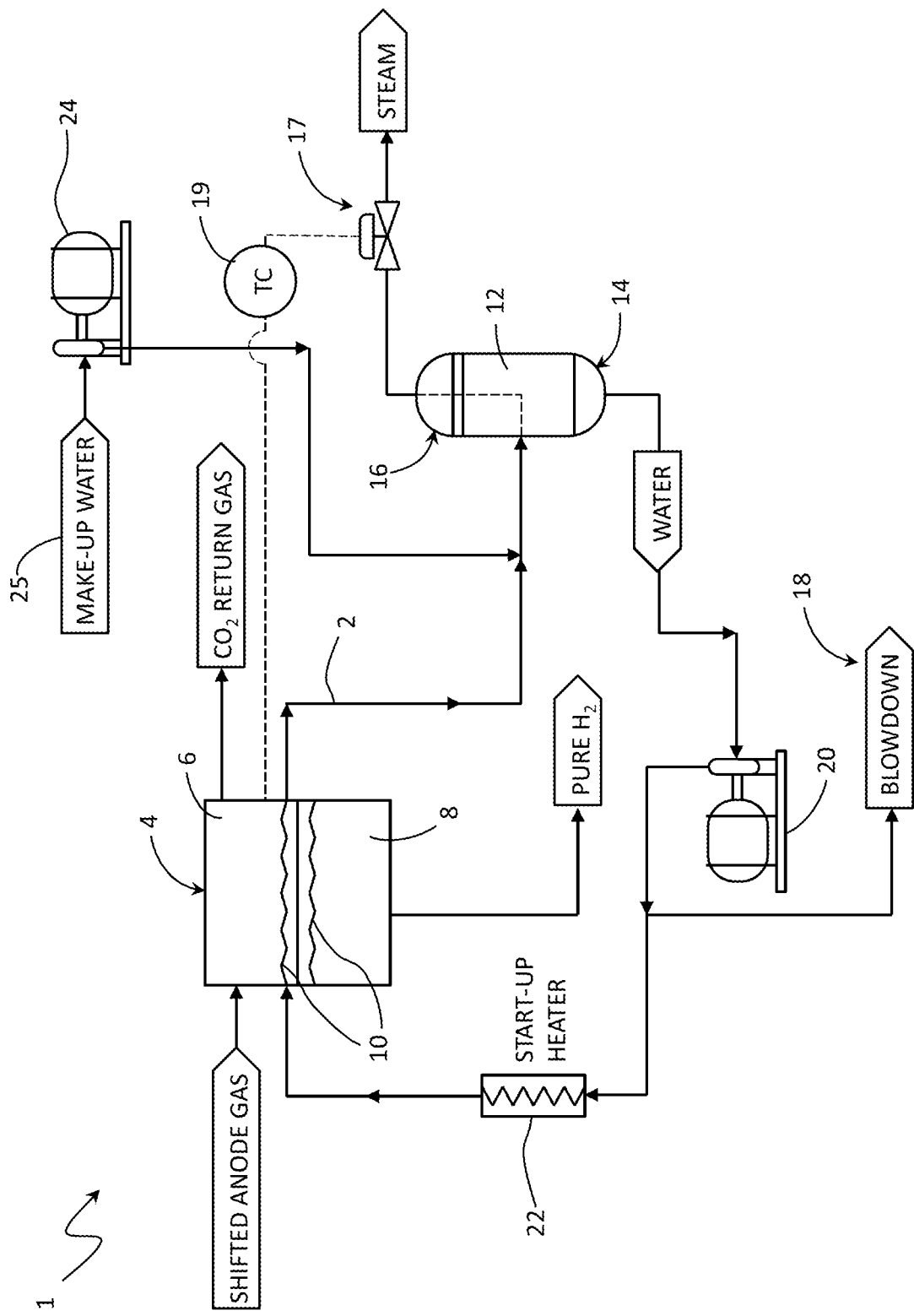
FIG. 1 is a schematic view of a cooling cycle in an electrochemical hydrogen separation system according to an exemplary embodiment.

Referring to FIG. 1, an EHS system 1 is shown according to an exemplary embodiment. The system 1 includes an EHS 4 having an anode 6, a cathode 8, and at least one cooling plate 10 (i.e., heat transfer plate) disposed between the anode 6 and the cathode 8. The anode 6 receives a shifted anode gas or other source of impure hydrogen as an impure anode feed gas. For example, the impure anode feed gas may be shifted anode exhaust gas from an anode of a fuel cell (e.g., a molten carbonate fuel cell (MCFC) or SureSource™ fuel cell) or may be another source of feed gas. The impure anode feed gas is already shifted (e.g., through a water-gas shift reaction) prior to being fed to the anode 6 of the EHS 4. After reaction in the EHS 4, the anode 6 outputs a return gas, including at least $CO_2$ and/or other impurities present in the anode feed gas. The cathode 8 outputs purified hydrogen at or above the pressure of the anode feed gas to the EHS 4. The return gas may be stored or exported from the system 1 or may be returned to the cathode of the fuel cell (e.g., the MCFC) after oxidation of any residual fuel with air in order to recover the heating value of the return gas. In this configuration, the cathode 8 in the EHS 4 may output a substantially purified stream of hydrogen.

As shown in FIG. 1, according to an exemplary embodiment, the at least one cooling plate 10 includes a cooling plate 10 (i.e., first cooling plate) disposed in or proximate the anode 6 and another cooling plate 10 (i.e., second cooling plate) disposed in or proximate the cathode 8. Each cooling plate 10 is configured to receive water passing therethrough, fluidly separating the water from direct contact with the anode 6 and the cathode 8. As the water passes through the cooling plates 10, heat is transferred from at least one of the anode 6 or the cathode 8, through the corresponding cooling plate 10, and to the water flowing through the cooling plate 10.

In a first step of a cooling cycle 2, when the heat is transferred in the EHS 4, at least a portion of the water in the cooling plates 10 is vaporized and the temperature in the corresponding anode 6 or the cathode 8 is lowered (i.e., cooled). Specifically, as shown in FIG. 1, heat from the electrical energy input to the EHS 4, which transfers hydrogen from the anode 6 to the cathode 8, is transferred to the water, such that at least a portion of the water is vaporized. After vaporization of at least a portion of the water in the cooling plate 10, a cooling plate output stream is generated, which includes steam or a mixture of water and steam. In a second step of the cooling cycle 2, this cooling plate output stream is output from the cooling plate 10 and is fed to (i.e., received in) a Liquid-Vapor Separator ("LVS") 12, as will be described in further detail below.

While FIG. 1 shows each of the anode 6 and the cathode 8 having one cooling plate 10, according to other exemplary embodiments, the EHS 4 may include more or fewer cooling plates 10 and the cooling plates 10 may be disposed in the EHS 4 in other positions. For example, three or more EHS cells may be disposed between two cooling plates 10. The amount of heat transferred through the cooling plates 10 may be controlled by controlling the cooling water temperature flowing therethrough, as discussed in further detail below, and may correlate directly with the number of cooling plates 10 present in the EHS 4. For ease of reference, where the description refers to a "cooling plate," it should be understood that such reference may also refer to configurations that include more than one cooling plate. According to other exemplary embodiments, a passage formed in the cooling plates 10 may be increased in size (e.g., diameter), such that more water passes through the cooling plates 10 to enable additional heat to be transferred thereto.

Referring still to FIG. 1, in a third step of the cooling cycle 2, the cooling plate output stream is received from the cooling plate 10 in the LVS 12 (i.e., knockout pot, reservoir, etc.) and separated into separate components of liquid water and steam. Specifically, the LVS 12 is configured to house liquid water and/or steam and separate the water and steam into separate outputs. The LVS 12 includes a lower (e.g., water outlet) end 14 and an upper (e.g., steam outlet) end 16. In the third step of the cooling cycle 2, steam from the cooling plate output stream rises toward the upper end 16 of the LVS 12 and, due to gravity, liquid water from the cooling plate output stream collects proximate the lower end 14 of the LVS 12, separating the steam and the water in the cooling plate output stream. In a fourth step of the cooling cycle, the water may be output from the lower end 14 of the LVS 12. Further, the steam may be output from the upper end 16 of the LVS 12. The steam may be exported from the system 1, or used in other portions of the system 1. For example, the steam may be used to humidify feed gas for other fuel cells in the system 1, as will be discussed below with respect to FIG. 2.

According to an exemplary embodiment, the operating temperature of the EHS 4 is maintained at a desired temperature by controlling the water flowing through the cooling plate 10. For example, as more steam is introduced from the LVS 12 into the cooling cycle 2, the temperature of the water passing through the cooling plates 10 increases. Similarly, as the amount of steam in the cooling cycle 2 reduces, the temperature of the water passing through the cooling plates 10 decreases. As a result, the amount of steam passing from the LVS 12 to the cooling cycle 2 and therefore the temperature of the water in the cooling cycle 2 is controlled by controlling the pressure in the LVS 12.

As shown in FIG. 1, the system 1 includes a valve 17 (e.g., a blow off valve), which is coupled to the upper end 16 of the LVS 12 and configured to output steam from the LVS 12 and the system 1 as a whole. A temperature controller 19 is coupled to the valve 17 and is configured to actuate the valve 17 between an "open" configuration and a "closed" configuration. In the "open" configuration, steam may pass from the upper end 16 of the LVS 12, through the valve 17, and out of the system 1. In this configuration, the pressure is reduced in the LVS 12, reducing the amount of steam available for recirculation and increasing the proportion of liquid water in the temperature cooling cycle 2. By decreasing the steam-to-water ratio, outputting steam from the cooling cycle 2 lowers the temperature in the cooling cycle 2. In the "closed" configuration, pressure from steam buildup in the LVS 12 is maintained in the system 1, causing more steam to pass through the cooling cycle 2 and increasing the temperature in the cooling cycle 2. It should be understood that the pressure in the LVS 12 and therefore the temperature in the cooling cycle 2 is controlled by controlling the output of excess steam from the LVS 12.

The temperature controller 19 is connected to the anode 6, either physically or wirelessly, and is configured to sense or measure a temperature in the anode 6. For example, the temperature controller 19 may be connected to a temperature sensor in the anode 6, which sends a signal to the temperature controller 19 indicating the temperature of the anode 6. When the temperature of the anode 6 reaches a pre-determined first threshold temperature, the temperature controller 19 opens the valve 17 or instructs the valve 17 to open, thereby outputting steam from the cooling cycle 2. Similarly, when the temperature in the anode 6 falls below a pre-determined second threshold temperature, the temperature controller 19 closes the valve 17 or instructs the valve 17 to close, thereby maintaining pressure and steam buildup in the cooling cycle 2.

According to an exemplary embodiment, the most efficient heat transfer through the cooling plates 10 may occur when the cooling cycle 2 maintains a two-phase flow through the cooling plates 10, thereby maintaining a uniform cell temperature across the anode 6 and/or the cathode 8. The first and second threshold temperatures or other measurement used to activate the valve 17 may be selected, such that the cooling cycle 2 maintains the two-phase flow, described above. It should be understood that while FIG. 1 shows the temperature controller 19 connected to the anode 6 for measuring the temperature thereof, according to other exemplary embodiments, the temperature controller 19 may be connected to the cathode 8, the cooling plates 10, or another portion of the system 1 along the cooling cycle 2 for measure a temperature thereof.

A first pump 20 receives the remaining water output from the LVS 12 and not output as steam from the LVS 12 through the valve 17. The first pump 20 pumps the water (e.g., liquid water or a two-phase mixture) from the lower end 14 of the LVS 12, downstream toward the cooling plate 10 for reintroduction to the EHS 4. The first pump 20 may control a flow rate of water circulation through the cooling cycle 2 and therefore the cooling plates 10 to ensure that water in the cooling plates 10 is only partially vaporized and that the two-phase mixture is maintained in the cooling plates 10. For example, the longer water rests in the cooling plates 10, the more it will evaporate and generate steam. If the water moves too slowly through the cooling plates 10, it will transition from a two-phase mixture to pure steam, at which point it transfers heat away from the anode 6 and/or the cathode 8 less efficiently. The flow rate through the cooling plates 10 may be controlled, at least in part, based on the flow rate through the pump 20.

According to an exemplary embodiment, the cooling cycle 2 further includes a water blowdown outlet 18. As shown in FIG. 1, the blowdown outlet 18 is disposed downstream from the first pump 20 and is configured to output excess water from the cooling cycle 2. For example, if the steam-to-water ratio is too low, rather than increasing a buildup of steam in the LVS 12 over time, water may be output from the cooling cycle 2 through the blowdown outlet 18 in order to provide the desired two-phase mixture to the cooling plates 10. While FIG. 1 shows the blowdown outlet 18 downstream from the first pump 20, according to other exemplary embodiments, the blowdown outlet 18 may be disposed upstream from the first pump 20 and downstream from the LVS 12.

Prior to being received by the cooling plate 10, the water is passed through a startup heater 22. The heater 22 may be an in-line electric heater or other type of heat exchanger configured to heat the water from the LVS 12 prior to start of operation of the EHS 4. For example, the heater 22 operates during startup of the system 1 (e.g., from a cold start), heating the water from the LVS 12 and supplying the heated water to the cooling plate 10. In this configuration, the water output from the heater 22 is provided to the cooling plate 10 at a temperature greater than the temperature of the EHS 4. Heat is then transferred from the water and then through the cooling plate 10 to the anode 6 and/or the cathode 8 to bring the unit up to a desired operating temperature. For example, the heater 22 may be configured to increase the temperature of the water to a temperature above a dew point of the EHS feed gas prior to operation of the EHS 4 in order to prevent damage to the EHS 4 due to the presence of undesired humidity in the feed gas. The EHS 4 may operate at a higher efficiency as the operating temperature of the EHS 4 increases, although it should be understood that the higher operating temperature may reduce the lifecycle of the EHS 4. While FIG. 1 shows the heater 22 disposed downstream from the first pump 20 and upstream from the cooling plates 10, according to other exemplary embodiments, the heater 22 may be disposed upstream from one or both of the first pump 20 and the blowdown outlet 18 and downstream from the LVS 12.

If the water level in the system 1, or in the LVS 12 more specifically, is below a desired level for efficient operation of the system 1, additional make-up water may be introduced to the system 1 from a water supply 25, such that there is sufficient water available for vaporization in the cooling plate 10 and/or for humidifying feed gas for the MCFC, as will be discussed in further detail below. For example, makeup water may be introduced to the system 1 at the cooling cycle 2 in order to compensate for losses from one or both of the steam exported from the LVS 12 and water (e.g., blowdown water) output from the blowdown outlet 18.

When make-up water is introduced to the system 1 by the water supply 25, a second pump 24 may pump the make-up water from a water supply 25 into the cooling cycle 2 between the EHS 4 and the LVS 12. Specifically, the make-up water may be mixed with water output from the EHS 4 prior to the water being received at the LVS 12. The make-up water may be supplied at a temperature less than the operating temperature of the EHS 4, or at other temperatures. For example, when the make-up water is mixed with water from the EHS 4 for introduction to the LVS 12, the mixed water may be at a desired temperature for recirculation in the cooling cycle 2 back to the cooling plates 10. In this configuration, the make-up water may cool the water to a desired temperature to ensure a two-phase mixture in the cooling plates 10.

While FIG. 1 shows the make-up water introduced by the second pump 24 between the EHS 4 and the LVS 12, according to other exemplary embodiments, the second pump 24 may introduce the make-up water to other portions of the cooling cycle 2. For example, the second pump 24 may introduce the make-up water downstream from the LVS 12 and upstream from the first pump 20, downstream from the first pump 20 and upstream from the heater 22, or downstream from the heater 22 and upstream from the EHS 4. The second pump 24 may further control the flow rate of the water through the cooling plate 10 in coordination with or in place of the first pump 20, in substantially the same way discussed above with respect to the first pump 20.

Figure 2:
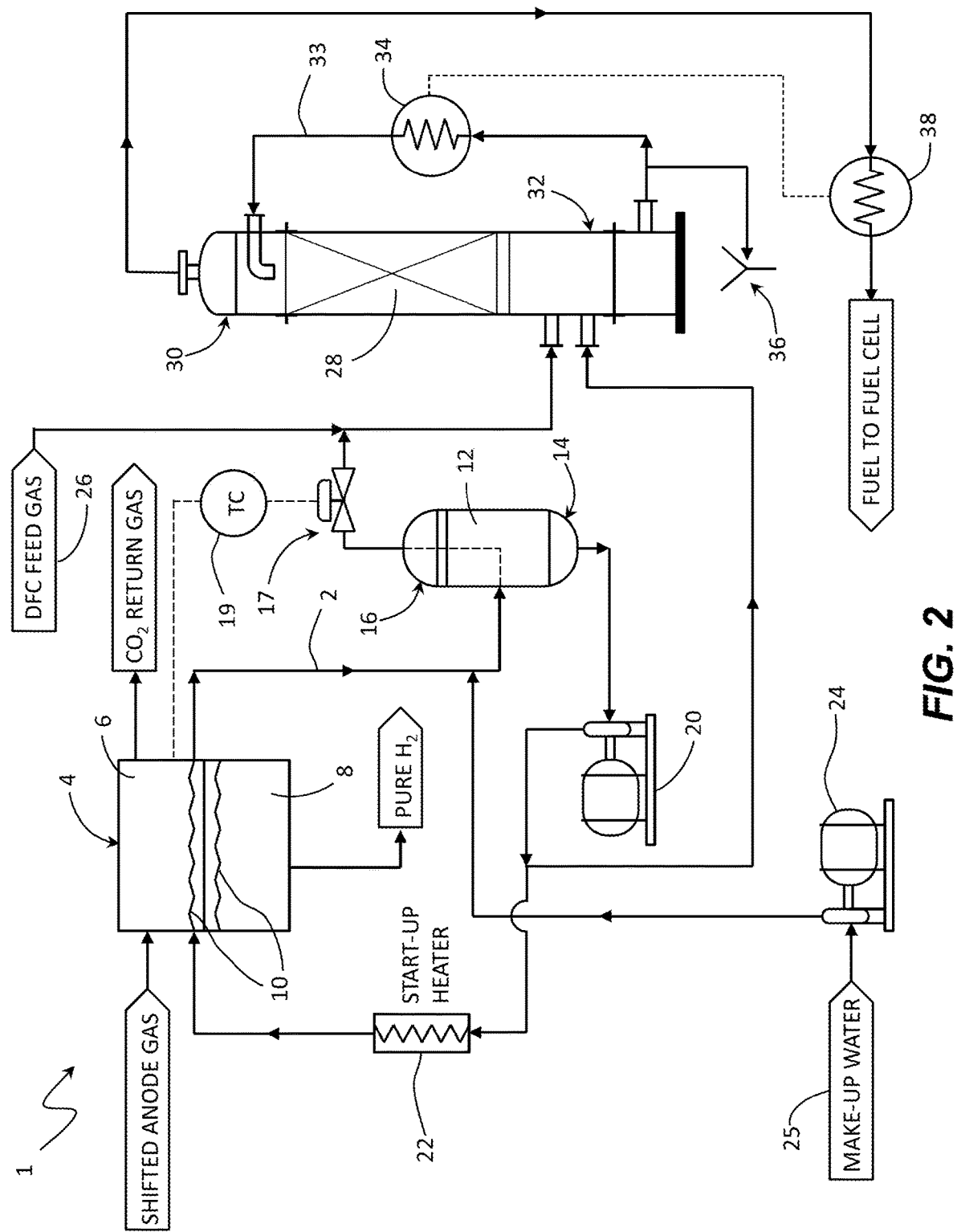
FIG. 2 is a schematic view of the cooling cycle and a humidification cycle in an electrochemical hydrogen separation system according to an exemplary embodiment.

Referring now to FIG. 2, the system 1 is shown according to another exemplary embodiment. Specifically, the system 1 in FIG. 2 includes the cooling cycle 2 as described above, as well as a humidification cycle 33, which includes a saturator 28 configured to humidify feed gas with the steam output from the LVS 12. In a first step of the humidification cycle 33, the steam (e.g., isolated steam) output from the upper end 16 of the LVS 12 is mixed with feed gas provided from a feed gas supply 26 or sent to a lower (e.g., water outlet) end 32 of the saturator 28. The mixture of the feed gas from the feed gas supply 26 and the steam from the LVS 12 partially saturates (i.e., humidifies) the feed gas, forming a partially-saturated feed gas. In a second step of the humidification cycle, this partially-saturated feed gas is then received in the saturator 28 for saturation to the desired level.

To further saturate the partially-saturated feed gas, the saturator 28 is configured to convert part of the liquid water in the saturator 28 into steam by using the feed gas to lower the partial pressure of the hot water. Similarly to the LVS 12, the saturator 28 includes an upper (e.g., saturated feed gas outlet) end 30, where the partially-saturated feed gas is mixed with hot water until it is saturated to the desired level, and the lower end 32, where water collects for water heating in a first heat exchanger 34 (i.e., a water heater). To provide hot water to the saturator 28 for saturating the fuel to the desired level, water is introduced to the saturator 28 in a third step of the humidification cycle 33. At least a portion of the water (e.g., identified as blowdown water in FIG. 1) output from the LVS 12 may be fed (i.e., blown down) to and received by the saturator 28 rather than supplied back to the cooling plate 10. Because the water supplied from the LVS 12 has already passed through the EHS 4, this water may be at a higher temperature than the make-up water from the water supply 25. In this configuration, the higher temperature of the water supplied from the LVS 12 further reduces the heat required to convert the water to steam in the saturator 28.

In a fourth step of the humidification cycle 33, water in the lower end 32 of the saturator 28 is output from the saturator 28 for heating and reintroduction to the upper end 30 of the saturator 28. The water is passed from the lower end 32 through a first heat exchanger 34. Cathode exhaust passes through the first heat exchanger 34 and heat is transferred from the cathode exhaust to the water, increasing the temperature of the water to generate hot (i.e., heated) water. In a fifth step of the humidification cycle 33, the hot water is received in the upper end 30 of the saturator 28 for mixture of the hot water with the partially-saturated feed gas. The presence of feed gas lowers the partial pressure of the hot water and causes at least a portion of the water to vaporize, humidifying the feed gas to the desired level. In the configuration shown in FIG. 2, the cathode exhaust may be supplied from the fuel cell. According to another exemplary embodiment, other gases or liquids (e.g., anode exhaust) may pass through the first heat exchanger 34 to provide heat to the water. While FIG. 2 shows a heat exchanger 34, the water may be heated by an in-line heater (e.g., similar to the heater 22) or another suitable heat source.

Referring still to FIG. 2, a portion of the water output from the saturator 28 in the humidification cycle 33 may be drained (i.e., output, export, remove, etc.) from the system 1 through a saturator drain 36 to prevent buildup of excessive dissolved solids in the water. If a water level in the saturator 28 is higher than a desired level, water may be drained through the saturator drain 36 to reduce the amount of water in the saturator 28. According to another exemplary embodiment, if the steam-to-carbon ratio in the saturator is too high (e.g., above 2.0), less heat may be transferred to the water in the heat exchanger 34 or other portions of the humidification cycle 33 (e.g., heating the water to a lower temperature), until the proportion of steam is reduced to a desired steam-to-carbon ratio. The water output from the saturator drain 36 may be exported from the system 1, although according to other exemplary embodiments, the water may be returned to the cooling cycle 2 for passing through the cooling plate 10 as a portion of the make-up water supply 25.

Furthermore, the saturator drain 36 may be configured as a blow off valve or other mechanism for reducing pressure in the water stream output from the lower end 32 of the saturator 28. A temperature of the water in the saturator 28 may be controlled by adjusting pressure in the saturator 28. For example, similarly to the LVS 12, when pressure builds up in the saturator 28, the temperature of the water in the saturator 28 increases. By draining water from the saturator 28 through the saturator drain 36, the pressure in the saturator 28 may be reduced, thereby reducing the amount of water converted to steam in the saturator 28 due to pressure.

After the hot water is received in the saturator 28 from the first heat exchanger 34, the hot water is mixed with the partially-saturated feed gas already present in the saturator 28, such that the partially-saturated feed gas is further saturated. For example, the feed gas may be mixed (e.g., saturated) with the hot water introduced to the saturator 28 until the mixture provides a steam-to-carbon ratio of approximately 2.0, defining a saturated feed gas. According to another exemplary embodiment, the fully saturated feed gas may require other steam-to-carbon ratios based on the fuel cell receiving the fully saturated feed gas. For example, a DFC may require a different or same steam-to-carbon ratio as a MCFC or SOFC for efficient operation.

Because the LVS 12 provides at least a portion of the steam required in the saturator 28 to saturate the feed gas to the desired level, the humidification cycle 33 does not supply all of the heat to the saturator 28, which is required to saturate the feed gas to the desired steam-to-carbon ratio. Therefore, the saturator 28 in the system 1 shown in FIG. 2 has a lower heat consumption requirement than a system that does not include the LVS 12. As a result, by reducing the amount of heat needed in the saturator 28, the size and capacity of the first heat exchanger 34 can be reduced and therefore operation of the saturator 28 in the humidification cycle 33 is more energy efficient than a comparable system without the LVS 12. This reduction in energy consumption in the humidification cycle 33 therefore improves the overall operational efficiency of the system 1 as a whole.

When the feed gas in the saturator 28 is saturated to the desired level with the hot water formed in the humidification cycle 33, the saturated feed gas is separated from the water and output from the upper end 30 of the saturator 28. The saturated feed gas may then be superheated and then fed to a pre-convertor to be reformed or is fed directly to the fuel cell. Specifically, as shown in FIG. 2, prior to being fed to a pre-converter or the fuel cell, the saturated feed gas may first be passed through a second heat exchanger 38. Heat may be transferred through the second heat exchanger 38 to the saturated feed gas passing therethrough, increasing the temperature of the saturated feed gas until the saturated feed gas is superheated.

The first and second heat exchangers 34, 38 may be fluidly connected through a duct or other conduit, such that a gas or liquid (e.g., cathode exhaust) may be received in one of the first and second heat exchangers 34, 38 and passed to the other of the first and second heat exchangers 34, 38. For example, cathode exhaust may first pass through the second heat exchanger 38 before being introduced to the first heat exchanger 34. In this configuration, heat is transferred from the cathode exhaust to the saturated fuel to provide the saturated fuel to the fuel cell at a desired higher temperature than in the saturator 28. The cathode exhaust is then passed from the second heat exchanger 38 to the first heat exchanger 34. In the first heat exchanger 34, heat remaining in the cathode exhaust is transferred to the water in the humidification cycle 33. The cathode exhaust is then output from the first heat exchanger 34 and may be exported from the system 1 or fed to another portion of the system 1. For example, the cathode exhaust may be fed to a Heat Recovery Unit ("HRU") configured to recover heat from the cathode exhaust or other stream for use in other portions of the system 1 or in other external systems. Because a portion of the heat needed in the saturator 28 is provided from the LVS 12 and the first heat exchanger 34 is not required to receive as much heat for heating water, less heat is transferred from the cathode exhaust to water in the saturator 28. In this configuration, more heat may be available for recovery in the HRU or in other portions of the system 1.

According to another exemplary embodiment, cathode exhaust may first pass through the first heat exchanger 34 before being introduced to the second heat exchanger 38. In this configuration, heat is transferred from the cathode exhaust to the water in the humidification cycle 33. The cathode exhaust is then passed from the first heat exchanger 34 to the second heat exchanger 38. In the second heat exchanger 38, heat remaining in the cathode exhaust is transferred to the saturated fuel to provide the saturated fuel to the fuel cell at a desired higher temperature than in the saturator 28. The cathode exhaust is then output from the second heat exchanger 34 and may be exported from the system 1 or fed to another portion of the system 1.

Still referring to FIG. 2, the make-up water is introduced to the system 1 prior to (e.g., upstream of) the blowdown water being fed to the saturator 28. In this configuration, the make-up water passes through the LVS 12 and is heated up before being fed to the saturator 28. According to other exemplary embodiments, the make-up water may be introduced to the cooling cycle 2 at other locations, as described above, with respect to FIG. 1.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of this disclosure as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the position of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is to be understood that although the present invention has been described with regard to preferred embodiments thereof, various other embodiments and variants may occur to those skilled in the art, which are within the scope and spirit of the invention, and such other embodiments and variants are intended to be covered by corresponding claims. Those skilled in the art will readily appreciate that many modifications are possible (e.g., variations in structures, shapes and proportions of the various elements, values of parameters, mounting arrangements, orientations, etc.) without materially departing from the novel teachings and advantages of the subject matter described herein. For example, the order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

What is claimed is:

1. An electrochemical hydrogen separation (EHS) system, comprising:
   an EHS cell comprising:
      an anode;
      a cathode; and
      a cooling plate disposed proximate at least one of the anode or the cathode, the cooling plate configured to receive water and configured to output steam or a mixture of water and steam; and a liquid-vapor separator (LVS) configured to receive the steam or the mixture of water and steam from the cooling plate and to separate water and steam;

wherein the LVS is configured to output water to the cooling plate.

2. The system of claim 1, further comprising a saturator configured to receive steam from the LVS;

wherein the LVS is configured to output steam to the saturator.

3. The system of claim 2, wherein the saturator is configured to receive water from the LVS.

4. The system of claim 3, further comprising a heat exchanger configured to heat water from the saturator and output heated water to the saturator.

5. The system of claim 1, wherein the cooling plate is configured to transfer heat from at least one of the anode or the cathode to the water passing through the cooling plate.

6. The system of claim 5, wherein a temperature of the cooling plate is controlled by controlling a pressure in the LVS.

7. The system of claim 1, further comprising a heater configured to receive and heat water from the LVS; and wherein the cooling plate is configured to receive heated water from the LVS.

8. The system of claim 7, wherein the cooling plate is configured to transfer heat from at least one of the anode or the cathode to the water passing through the cooling plate.

9. The system of claim 1, wherein at least one of the anode or the cathode is configured to receive a current and electrochemically separate hydrogen from other gases.

10. A method of operating an electrochemical hydrogen separator (EHS) system, comprising:

passing water through a cooling plate disposed proximate at least one of an anode or a cathode in an EHS;

transferring heat from at least one of the anode or the cathode, through the cooling plate, to the water in the cooling plate;

vaporizing at least a portion of the water in the cooling plate into steam;

outputting a mixture of water and steam from the cooling plate;

receiving the mixture of water and steam from the cooling plate at a liquid-vapor separator (LVS); and separating steam and water in the LVS.

11. The method of claim 10, further comprising feeding water from the LVS to the cooling plate.

12. The method of claim 10, further comprising mixing steam from the LVS with feed gas for a fuel cell; and feeding a mixture of steam and feed gas to a saturator.

13. The method of claim 12, wherein prior to being fed to the saturator, the mixture of steam and feed gas has a steam-to-carbon ratio less than 2.0.

14. The method of claim 13, further comprising:

feeding steam from the LVS to the saturator; and feeding water from the LVS to the saturator.

15. The method of claim 14, further comprising vaporizing water from the saturator in a first heat exchanger;

outputting steam from the first heat exchanger to the saturator; and mixing steam from the first heat exchanger with the mixture of steam and feed gas.

16. The method of claim 15, wherein the mixture of steam and feed gas in the saturator has a steam-to-carbon ratio of approximately 2.0.

17. A method of operating an electrochemical hydrogen separator (EHS) system, comprising:

passing water through a cooling plate disposed proximate at least one of an anode or a cathode in an EHS;

transferring heat from the water through the cooling plate to at least one of the anode or the cathode;

receiving water from the cooling plate at a liquid-vapor separator (LVS);

heating water from the LVS in a heater; and receiving water from the heater at the cooling plate.

18. The method of claim 17, further comprising separating steam and water in the LVS; and outputting steam from the LVS.

19. The method of claim 17, further comprising feeding at least a portion of the water from the LVS to a saturator.

20. The method of claim 17, further comprising introducing make-up water to the system upstream from the heater.

* * * * *